Sept. 8, 1959    H. G. TWIFORD ET AL    2,902,862
STATIC WHEEL BALANCER

Filed May 16, 1955    2 Sheets-Sheet 1

INVENTORS.
Harry G. Twiford
Donald G. McPherson
BY

ATTORNEYS

Sept. 8, 1959   H. G. TWIFORD ET AL   2,902,862
STATIC WHEEL BALANCER
Filed May 16, 1955   2 Sheets-Sheet 2
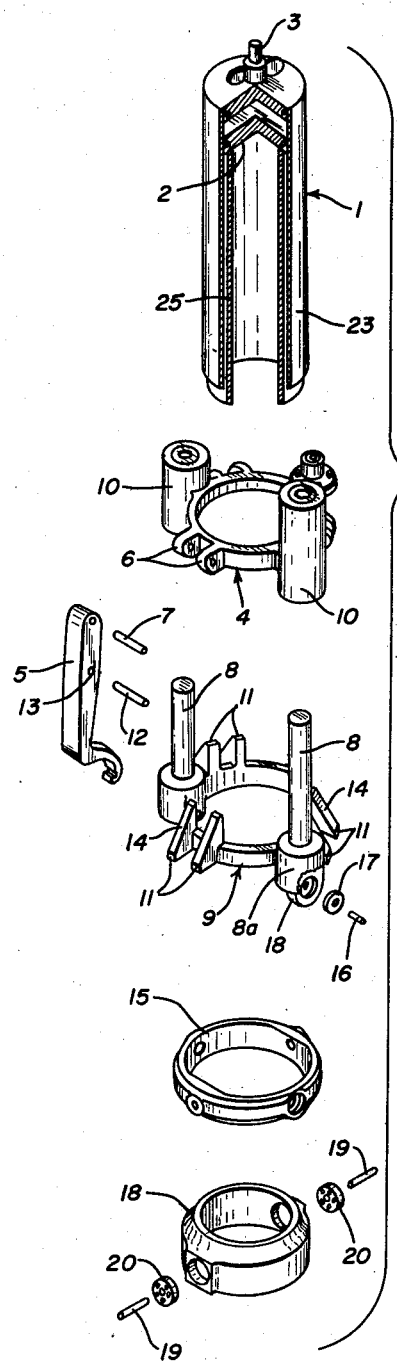
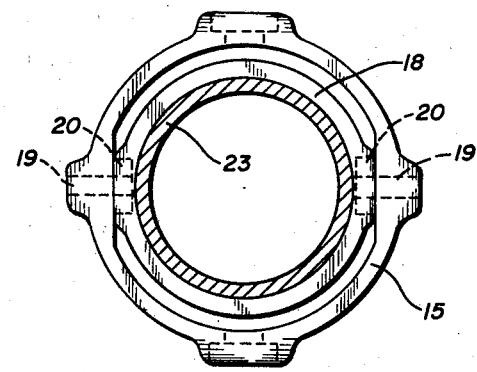
Fig.-6
Fig.-3
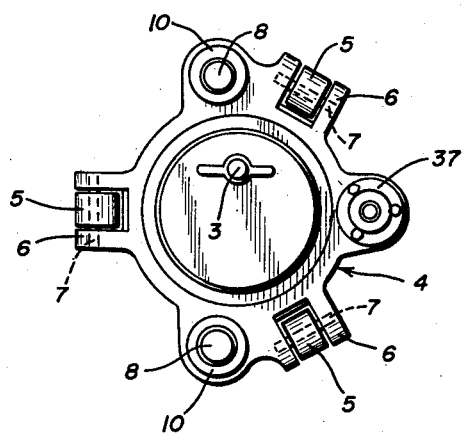
Fig.-4
INVENTORS.
Harry G. Twiford
Donald G. McPherson
BY
ATTORNEYS

United States Patent Office 2,902,862
Patented Sept. 8, 1959

2,902,862

STATIC WHEEL BALANCER

Harry G. Twiford and Donald G. McPherson, Denver, Colo.

Application May 16, 1955, Serial No. 508,383

3 Claims. (Cl. 73—485)

This invention relates to wheel balancing devices and more particularly to static wheel balancers for vehicle, pneumatic-tired wheels.

It is well known that a balanced wheel will wear evenly on its tread, and that an unbalanced wheel will wear unevenly and will not give maximum mileage. The majority of repairs for automobile wheels are performed by service stations which do not normally have wheel balancing machines, so that a large number of automobile wheels are not properly maintained for maximum service. Further, where a dynamic wheel balancer is available, a considerable amount of time is consumed in balancing the four wheels of the automobile, and therefore vehicle owners are not inclined to have their wheels balanced as often as is necessary.

Almost any repair manipulation of a pneumatic tired wheel, and any manipulation which changes the position of the tire in relation to wheel changes the balance of the wheel. Tire repairs and changes generally unbalance the wheel, and for maximum use the wheel should be balanced each time any manipulation is performed thereon. Whether a tire is merely removed and replaced on a wheel or a new tire is placed on the wheel, the wheel should be balanced. An inexpensive, easily-operated wheel balancing device would, obviously, be a great asset to a service station and would provide means for giving the motoring public greater service.

According to the present invention, we have provided an inexpensive, static balancer for vehicle wheels, which is adapted to be used in conjunction with standard tire changing machines, so that tire handling will be kept at a minimum. The wheel balancer may, also, be used independently of a tire changer. The balancer is adapted for use with any wheel supporting device in which the wheel is supported in a horizontal position and in which a center post may be extended through the hub hole for supporting the balancer. The device includes a tripod wheel grip arranged to grip and hold a wheel internally of its hub hole on activating a lifting device for raising the wheel above its supporting surface. A system of balance points permits free tipping in any direction of the suspended wheel, and an attached bubble level indicates the balance of the wheel. As the device will normally be used in conjunction with a tire changer, in the preferred form, an air cylinder is provided for raising the wheel to its suspended position, utilizing the air line which must be available for the tire changing operation.

Included among the objects and advantages of the present invention is a static wheel balancer which utilizes a lifting device for extending wheel holding legs, and for lifting the wheel to suspended position above its supporting surface. The device is a precision instrument for accurately determining the static balance of a vehicle wheel, and which is inexpensive and yet sufficiently accurate for general use. The static wheel balancer is quickly and easily installed for use with a wheel, and it is very simple in its operation. The balancer is arranged to be utilized with standard tire changing machines, and includes means for accurately gripping and maintaining a secure hold on a wheel at three spaced points to assure a correct balance of the wheel.

These and other objects and advantages may be readily ascertained by referring to the appended illustrations in which:

Fig. 3 is an exploded view of a balancer showing the various parts of the balancer;

Fig. 4 is a top plan view of the balancer of Fig. 2;

Fig. 6 is a sectional view of the balancing system of a bearings and pins assembly according to the invention.

Figure 1:
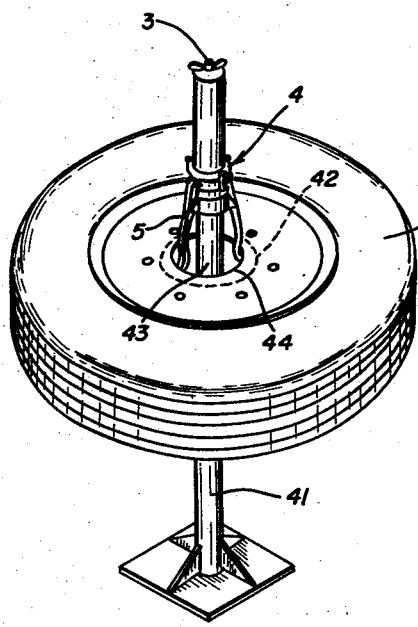
Fig. 1 is a perspective view of a wheel balancer, according to the present invention, in use with a vehicle wheel.
Figure 5:
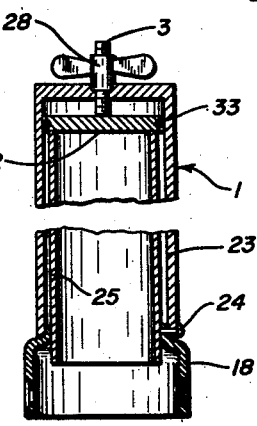
Fig. 5 is a cross sectional view of the lifting cylinder of the balancer of the present invention.
Figure 2:
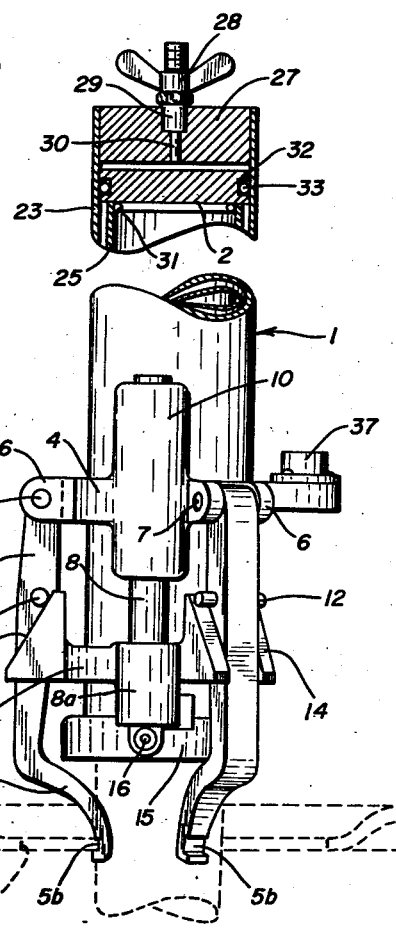
Fig. 2 is a partial sectional view of an assembled wheel balancer according to the present invention.

In the device illustrated in Figs. 1 to 4 the wheel balancer includes a power cylinder or hydraulic motor shown in general by numeral 1, which has a piston assembly shown by the general numeral 2 and a valve for introducing and releasing air from a cylinder. A leg retaining ring 4 is reciprocally mounted on the exterior of the cylinder 1 with sufficient clearance to permit tilting, and three legs 5 are mounted in leg bosses 6, set so that the longitudinal axis center of the legs are at exactly 120° apart. The legs 5 are pivotally secured to the boss 6 by means of leg pins 7 permitting the legs to freely swing outwardly from the center of the ring along a 120° plane from the axis of the ring. The leg retaining ring is mounted on a pair of vertical rods 8 placed at 120°, on a leg expander or spreader ring 9. The leg retaining ring is mounted on the rods 8 by means of bearings 10 which permit free reciprocal movement of the leg retaining ring on the rods 8, and the ring 9 has a sufficiently loose fit to permit tilting on the cylinder. A pair of cams 11, spaced on either side of the legs 5 permit the legs to swing freely in and out of the space therebetween, are mounted on the spreader ring at exactly 120° apart. The cams are arranged so as to straddle each leg 5 when the device is assembled, and a pin 12 extending through a hole 13 in the leg is sufficiently long to extend a short distance beyond each side of the leg, engaging the upper surface 14 of the cam 11. The rod 12 in operative position on the cam surfaces 14 is clearly shown in Fig. 2.

The leg spreading ring 9 is secured to a center bearing ring 15 by means of pins 16 mounted in bearing housings 17, which are secured in bearing mounts 18 depending from the rod holder 8a. The center bearing ring 15 is secured by means of the pins 16 at 180 degrees apart and the ring is made so as to be balanced on the pins. The center bearing ring 15 is mounted on a cylinder collar 18 by means of pins 19 mounted in bearings 20. The pins 19 are mounted diametrically opposed to one another on the collar 18 and engage the center bearing ring 15 at 90 degrees to the pins 16, connecting the bearing ring 15 to the leg spreader ring 9. The cylinder collar 18 is secured to the cylinder wall 23 by means of drive screws 24, and the inner end of the collar is arranged to maintain the cylinder 23 spaced apart from the piston 25. In the completed assembly, the cylinder collar 18 is the only part which is secured to the cylinder, the remainder of the parts being supported from the collar or one from the other.

The cylinder piston assembly is a simply constructed device including an outer tube 23 which has a top 27 welded internally thereof and closing the upper end of the tube 23. The tube 23 may be a standard thin-walled tube since the amount of pressure required to produce sufficient force for the lifting of the wheel is nominal. An air valve and wing nut assembly 28 is secured in a bore 29 in the end piece 27, and a small bore 30 provides a communication between the bore 29 and the interior of the cylinder 23. The piston comprises a thin-walled tubing 25 welded at 31 to the end plate 2 of the piston. The end plate 2 has a peripheral groove 32 extending therearound, and an O-ring seal 33 disposed in the groove, forming a seal between the piston and the tube 23. This piston 25 is freely reciprocal within the tube 23, being stopped at one end by the end plate 27 and the cylinder collar 18 at the opposite end. The air valve assembly 28 permits air to be introduced into the cylinder for expanding the same and for holding the air in the cylinder until it is released.

A universal bubble level 37 (i.e., indicating tilting in two dimensions) is mounted on one side of the leg supporting ring 4 and is arranged to indicate the levelness of the mount. Any tilting of the leg support mount is indicated in the universal level 37.

In operating the balancer, a vehicle wheel and tire assembly 40, illustrated in Fig. 1, is placed on a stand 41 having a table 42 arranged to hold the wheel in a horizontal position. Where a tire has been changed using a standard tire changing machine, the balancer may be utilized on the tire changing machine instead of utilizing a stand as illustrated in Fig. 1. In actual practice, it is more expedient to use the tire changing table, since the tire is already in horizontal position on the device, and the wheel may merely be unclamped from the device, and the balancer inserted in place in the hub hole. In either event, whether the wheel is placed on a table 42 or is used on a tire changing machine, a center post 43 must be utilized for holding the wheel balancer. The wheel balancer tube for piston 25 is placed over the center post and the legs 5 are inserted in the hub hole 44 of the wheel. The legs 5 have a laterally offset portion 5a extending inwardly from the long axis of the leg and a grip portion 5b at the lower extremity of the leg. While pressing gently downwardly on the leg pivot ring 4, air pressure is applied to the cylinder through valve 28. As the cylinder rises, the leg expanding ring is lifted and pin 12 rides along cam face 14 spreading the legs until the grip 5b engages the edge 44 of the hub hole. The legs are spread and grip the wheel at 120 degrees around the hub hole. The air introduction is continued into the cylinder which lifts the tube 23 and the balancer, and since the wheel is now hooked to the balancer, the wheel will be lifted from the table. When the wheel is hanging completely free from the table, no further air need be applied to the cylinder. The wheel is suspended concentrically and any excess weight on one side of the wheel will tip the wheel in the direction of that heavy side. This tip will be indicated in the universal level 37 and weights may be added to the highest portion of the wheel rim to cause it to swing back to level position. When the level bubble shows that the wheel is hanging level, the wheel is lowered by releasing the air in the cylinder through valve 28 and the rim weights are hammered in place on the wheel rim. The balancer may be released from the wheel by gently lifting the leg expanding ring which permits the legs to fall free from their grip on the wheel, and the balancer may then be removed.

The balancer is illustrated using ball bearings and pins placed diametrically opposite one another on the support and 90 degrees to the next adjacent pair of ball bearings and pins so that the cylinder may tilt in all directions. In place of the ball bearings and pins, knife edges, needle points, or any other type of sensitive balance-bearing may be utilized. The leg spreading ring 9 may, also, be suspended from the collar by means of wires which would provide a similar mount to the pins and bearings except that the parts would be suspended from one another rather than resting on one another. The wheel balancer is statically balanced within its own construction and very little adjustment is required to maintain the device in balance. The balancer is a precision instrument for accurately balancing a vehicle wheel, but it is sufficiently rugged to permit it to be used by unskilled or semi-skilled labor in the smallest tire store or service station. The device, further, permits any tire store or filling station operator with a tire changing machine or a tire holding table to balance vehicle wheels easily and quickly. With a tire changing machine, the wheel is already in position ready to be balanced, and the operator can balance the wheel in a matter of seconds.

While the invention has been described by reference to a specific embodiment, there is no intent to limit the invention to the precise details so set forth, except insofar as limited by the following claims.

We claim:

1. A static wheel balancer for a horizontally positioned vehicle wheel comprising wheel holding means inclusive of at least three uniformly-spaced supports arranged for internally gripping the hub hole of a wheel, power cylinder means having a stationary member and extensible member extending upwardly from a base member through the hub hole of a held wheel, said extensible member being interconnected with said wheel holding means and arranged to move the said wheel holding supports from an inward inoperative position outwardly to a wheel holding position and then lift the wheel to a free suspended position, a system of suspension means interconnected between said extensible member and said wheel supports arranged to permit a suspended wheel to tilt under unbalanced conditions, and bubble level indicating means interconnected with the wheel holding means.

2. A static wheel balancer for horizontally positioned vehicle wheels comprising an extendable power cylinder means inclusive of a stationary member arranged to be mounted on a base member and an extensible member mounted in vertical position and extending through the hub hole of a wheel with which it is in register, at least three pivoted gripping members interconnected with the extensible member of said cylinder means and symmetrically spaced therearound, means actuated by extensible member of said power cylinder means for moving said gripping members into holding contact with the edge of the wheel hub hole, said extensible member of said power cylinder means arranged to lift a held wheel into suspended position after moving the gripping members into wheel holding position, suspension means interconnected between said extensible member and the wheel gripping members and said cylinder and arranged to permit free tilting of said suspended wheel, and level indicating means interconnected with the wheel gripping members.

3. A wheel balancer according to claim 2 in which the suspension means includes a concentric ring universal joint interconnected by a bearing and pin journal system set at 180 degrees to each other and interconnected between said extensible member and said wheel gripping means to permit universal tilting of the wheel holding means.

References Cited in the file of this patent

UNITED STATES PATENTS

| | | |
|---|---|---|
| 164,240 | Wertheim | June 8, 1875 |
| 915,718 | Bassett | Mar. 16, 1909 |
| 1,701,464 | Kraft | Feb. 5, 1929 |
| 2,270,657 | Kraft | Jan. 20, 1942 |
| 2,338,057 | Peterson | Dec. 28, 1943 |
| 2,462,266 | Howard | Feb. 22, 1949 |
| 2,589,456 | Tinkham | Mar. 18, 1952 |
| 2,698,537 | Taylor et al. | Jan. 4, 1955 |